United States Patent
Ahn et al.

(10) Patent No.: US 10,560,659 B2
(45) Date of Patent: Feb. 11, 2020

(54) TERMINAL FOR PROVIDING VIDEO CALL SERVICE

(71) Applicant: HYPERCONNECT, INC., Seoul (KR)

(72) Inventors: Sang Il Ahn, Chungcheongbuk-do (KR); Hee Min Choi, Seoul (KR)

(73) Assignee: HYPERCONNECT, INC., Seoul (KR)

( * ) Notice: Subject to any disclaimer, the term of this patent is extended or adjusted under 35 U.S.C. 154(b) by 0 days.

(21) Appl. No.: 16/223,770

(22) Filed: Dec. 18, 2018

(65) Prior Publication Data

US 2019/0208165 A1  Jul. 4, 2019

(30) Foreign Application Priority Data

Dec. 28, 2017 (KR) .................... 10-2017-0182781

(51) Int. Cl.
| | | |
|---|---|---|
| *H04N 7/14* | (2006.01) | |
| *G06K 9/00* | (2006.01) | |
| *G06F 3/0481* | (2013.01) | |
| *H04N 5/445* | (2011.01) | |

(52) U.S. Cl.
CPC ......... *H04N 7/141* (2013.01); *G06F 3/04817* (2013.01); *G06K 9/00302* (2013.01); *H04N 5/445* (2013.01)

(58) Field of Classification Search
CPC ..................................................... H04N 7/14
See application file for complete search history.

(56) References Cited

U.S. PATENT DOCUMENTS

| | | | |
|---|---|---|---|
| 8,581,953 B2 | 11/2013 | Kim | |
| 9,531,998 B1 * | 12/2016 | Farrell | ................. A63F 13/352 |
| 2007/0139512 A1 | 6/2007 | Hada et al. | |
| 2008/0158334 A1 * | 7/2008 | Reponen | ................ H04N 7/147 |
| | | | 348/14.02 |

FOREIGN PATENT DOCUMENTS

| | | |
|---|---|---|
| JP | H09-138767 A | 5/1997 |
| JP | 2004-104424 A | 4/2004 |
| JP | 2005-323340 A | 11/2005 |
| JP | 2010-183444 A | 8/2010 |
| KR | 20100062207 A | 6/2010 |
| KR | 10-2011-0025718 A | 3/2011 |
| KR | 20110020131 A | 3/2011 |
| KR | 20110023524 A | 3/2011 |
| KR | 20110030223 A | 3/2011 |
| KR | 10-2013-0122300 A | 11/2013 |
| KR | 101533065 B1 | 7/2015 |

OTHER PUBLICATIONS

Korean Office Action for Application No. 10-2017-0182781, dated Mar. 11, 2019.
European Search Report for Application No. 18211782.0, dated Feb. 12, 2019.
Japanese Office Action for Application No. 2018-236646, dated Nov. 1, 2019.

\* cited by examiner

*Primary Examiner* — Olisa Anwah
(74) *Attorney, Agent, or Firm* — Marshall, Gerstein & Borun LLP

(57) ABSTRACT

Provided is an application stored in a computer-readable storage medium to perform a method of providing a video call service using icon information corresponding to a facial expression of a user.

14 Claims, 16 Drawing Sheets

TERMINAL FOR PROVIDING VIDEO CALL SERVICE

CROSS-REFERENCE TO RELATED APPLICATION

This application claims the benefit of Korean Patent Application No. 10-2017-0182781, filed on Dec. 28, 2017, in the Korean Intellectual Property Office, the disclosure of which is incorporated herein in its entirety by reference.

BACKGROUND

1. Field

One or more embodiments relate to a terminal for providing a video call service using icon information corresponding to a facial expression of a user.

2. Description of the Related Art

With the development of science and technology, most people have possessed terminals such as smartphones or tablet PCs. Such a terminal may capture or replay images, exchange information by communicating with other terminals, or support a video call.

There are various types of video call services based on a video call. For example, a random video chatting service is a service for connecting a terminal of one user requesting use of a random video chatting service to a terminal of another user randomly selected from among users using the random video chatting service.

SUMMARY

One or more embodiments include a terminal for providing a video call service using icon information corresponding to a facial expression of a user so that a video call between users can be conducted in a good mood by inducing many facial expressions between the users conducting the video call.

Additional aspects will be set forth in part in the description which follows and, in part, will be apparent from the description, or may be learned by practice of the presented embodiments.

According to one or more embodiments, an application is stored in a computer-readable storage medium to perform a method of providing a video call service, the method including, in a first terminal, establishing a video call session between the first terminal of a first user and a second terminal of a second user, detecting a facial expression of the first user from a first video stream that captures the first user, generating icon information corresponding to the detected facial expression of the first user, and transmitting generated icon information to the second terminal.

According to one or more embodiments, an application is stored in a computer-readable storage medium to perform a method of providing a video call service, the method including, in a first terminal, establishing a video call session between the first terminal of a first user and a second terminal of a second user who is a counterpart in a video call, detecting a facial expression of the second user from a second video stream that captures the second user and is received from the second terminal, generating icon information corresponding to the detected facial expression of the second user, and displaying generated icon information on a screen of the first terminal.

According to one or more embodiments, a non-transitory computer-readable storage medium stores instructions that are executable by a processor, the instructions including instructions to establish a video call session between the first terminal of a first user and a second terminal of a second user, instructions to detect a facial expression of the first user from a first video stream that captures the first user, instructions to generate icon information corresponding to a detected facial expression of the first user, and instructions to transmit generated icon information to the second terminal.

According to one or more embodiments, a non-transitory computer-readable storage medium stores instructions that are executable by a processor, the instructions including instructions to establish a video call session between the first terminal of a first user and a second terminal of a second user who is a counterpart in a video call, instructions to detect a facial expression of the second user from a second video stream that captures the second user and is received from the second terminal, instructions to generate icon information corresponding to a detected facial expression of the second user, and instructions to display generated icon information on a screen of the first terminal.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
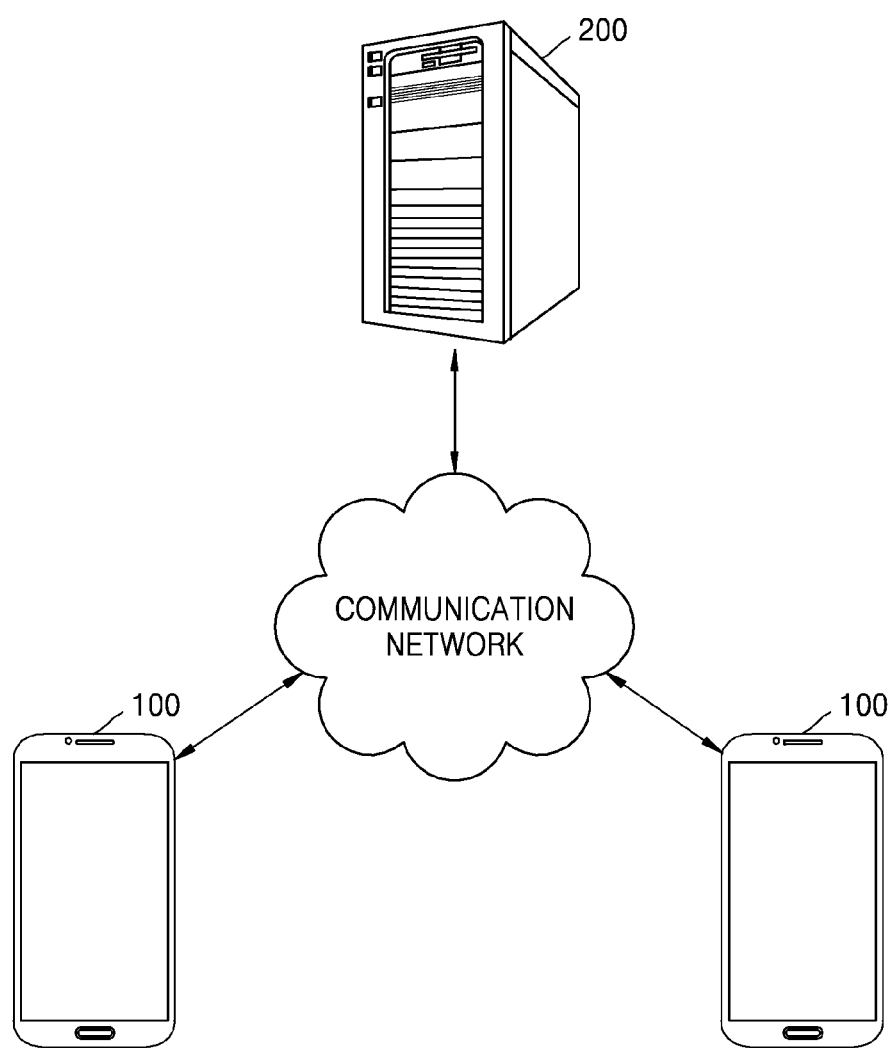
FIG. 1 illustrates an environment in which a video call service is provided.

The present disclosure will now be described more fully with reference to the accompanying drawings, in which embodiments of the disclosure are shown. In the following description, when detailed descriptions about related well-known functions or structures are determined to make the gist of the present disclosure unclear, the detailed descriptions will be omitted herein. Throughout the drawings, like reference numerals denote like elements.

In the present specification, when a constituent element "connects" or is "connected" to another constituent element, the constituent element contacts or is connected to the other constituent element not only directly, but also electrically through at least one of other constituent elements interposed therebetween. Also, when a part may "include" a certain constituent element, unless specified otherwise, it may not be construed to exclude another constituent element but may be construed to further include other constituent elements.

Terms such as "first" and "second" are used herein merely to describe a variety of constituent elements, but the constituent elements are not limited by the terms. Such terms are used only for the purpose of distinguishing one constituent element from another constituent element.

Term "icon information" used in the present specification may mean the type and/or number of icons.

The present embodiments relate to a terminal for providing a video call service using icon information corresponding to a facial expression of a user, and detailed descriptions of items that have been widely known to a person having ordinary skill in the art to which the following embodiments belong are omitted.

FIG. 1 illustrates an environment in which a video call service is provided.

A video call service may signify a service through which a plurality of users may transmit each user's video to a counterpart by using each user's terminal or receive the counterpart's video in the same manner, thereby communicating with one another. Users using a video call service may exchange video and voice through each user's terminal and exchange text through a chatting function. A user who desires to use a video call service with a counterpart may use the video call service by directly appointing a counterpart or as a server for providing a video call service appoints a counterpart randomly or in a certain method.

Referring to FIG. 1, a terminal 100 is connected to a server 200 for providing a video call service via a communication network. The server 200 may store data and various programs or applications for assisting a plurality of users to use a video call service by using the terminal 100 of each user. The server 200 for providing a video call service may perform both local communication and remote communication. The server 200 for providing a video call service may be connected to a plurality of terminals 100 via a communication network. The terminal 100 may include various types of user terminals connected to the server 200 for providing a video call service. For example, the terminal 100 is a device for communicating with the server 200 for providing a video call service, and may include a wearable device such as a smart watch, a mobile device such as a smart phone, a tablet PC, and a laptop computer, and a stationary device such as a desktop computer. Furthermore, the terminal 100 may be a video call device for supporting a video call and may be capable of capturing and replaying a video so that a video call may be performed between users connected through a video call service.

Figure 2:
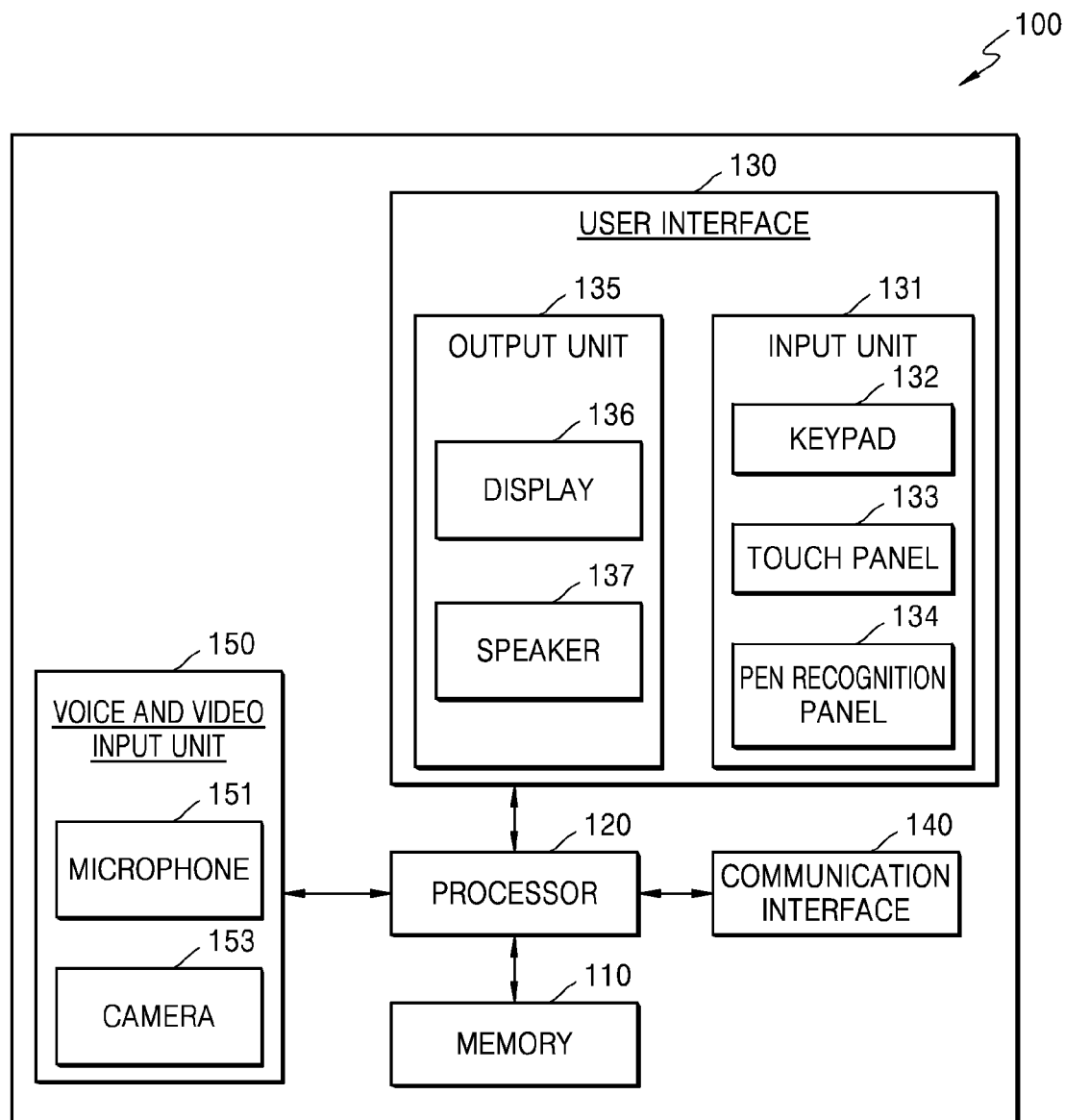
FIG. 2 is a block diagram of a configuration of a terminal according to an embodiment.

FIG. 2 is a block diagram of a configuration of the terminal 100 according to an embodiment.

Referring to FIG. 2, the terminal 100 may include a memory 110, a processor 120, a user interface 130, a communication interface 140, and a voice and video input unit 150. A person having ordinary skill in the art related to the present embodiment may see that other general purpose elements may be included in addition to the constituent elements illustrated in FIG. 2.

The memory 110 may store software or a program. For example, the memory 110 may store an application, a program such as application programming interface (API), and various types of data. The memory 110 may store instructions executable by the processor 120.

The processor 120 may execute the instructions stored in the memory 110. The processor 120 may use various programs, contents, and data stored in the memory 110, or store new programs, contents, and data in the memory 110.

The processor 120 may access the memory 110 and perform booting by using an operating system (O/S) stored in the memory 110. The processor 120 may perform various operations by using the programs, contents, and data stored in the memory 110. For example, the processor 120 may display a certain screen on a display 136 by using the programs, contents, and data stored in the memory 110. When a user performs an operation in an area of the display 136, the processor 120 may perform a control operation in response to the user's operation.

The processor 120 may include a graphics processing unit (GPU) specialized for graphing processing. When booting of the terminal 100 is completed, a GPU displays a user interface screen in an area of the display 136. In detail, the GPU may generate a screen displaying a video call layout including various objects such as contents, icons, and menus. The GPU may calculate attribute values such as a coordinate value, shape, size, and color to display the respective objects according to the video call layout of a screen. The GPU may generate a screen of various layouts including objects based on the calculated attribute values. The screen generated by the GPU may be provided to the display 136 and displayed in each area of the display 136.

The processor 120 may include a video processor and an audio processor. The processor 120 may control the video processor and the audio processor, and process a video stream received through the communication interface 140 or video data or audio data included in the video stream stored in the memory 110.

The user interface 130 may include an input unit 131 and an output unit 135.

The input unit 131 may receive an input of various instructions from a user. The input unit 131 may include at least one of a keypad 132, a touch panel 133, and a pen recognition panel 134.

The keypad 132 may include various types of keys such as mechanical buttons, and wheels formed in various areas such as a front surface portion, a side surface portion, or a rear surface portion of the exterior of a main body of the terminal 100.

The touch panel 133 may detect a touch pressure by a user, and output a touch event value corresponding to a detected touch signal. When the touch panel 133 is coupled to a display panel forming a touch screen, the touch screen may be implemented by various types of touch sensors such as an electrostatic type, a pressure-sensitive type, and a piezoelectric type.

The pen recognition panel 134 may detect a proximity input or a touch input of a pen according to an operation of a touch pen, for example, a stylus pen, by the user, and when the input is detected, output a detected pen proximity event or pen touch event. The pen recognition panel 134 may be implemented by, for example, an electromagnetic radiation (EMR) method, and may detect a touch or a proximity input according to a change in the intensity of an electromagnetic field by the proximity or touch of a pen. The pen recognition panel 134 may include an electromagnetic induction coil sensor having a grid structure and an electronic signal processing unit sequentially providing AC signals having a certain frequency to each loop coil of the electromagnetic induction coil sensor.

The output unit 135 may include the display 136 and a speaker 137.

The display 136 may include a display panel and a controller for controlling the display panel. The display panel may be implemented by various methods such as a liquid crystal display (LCD), an organic light-emitting diode (OLED) display, an active-matrix OLED (AM-OLED) display, and a plasma display panel (PDP). The display panel may be implemented to be flexible or wearable. The display 136 may be coupled to the touch panel 133 of the input unit 131 and provided as a touch screen.

The speaker 137 may output sound based on audio data. For example, the speaker 137 may output the voice of the user according to the audio data included in the video stream.

The communication interface 140 may perform communication with various types of external devices according to various types of communication methods. The communication interface 140 may include at least one of a Wi-Fi chip, a Bluetooth chip, a near field communication (NFC) chip, and a wireless communication chip. The processor 120 may perform communication with various external devices by using the communication interface 140.

The Wi-Fi chip and the Bluetooth chip may perform communication in a WiFi method and a Bluetooth method, respectively. When the Wi-Fi chip or the Bluetooth chip is used, various connection information such as a service set identifier (SSID) and a session key are first transceived, and thus, communication is established by using the information and then various pieces of information may be transceived. The NFC chip may signify a chip that is operated by a NFC method using a 13.56 MHz band among various RF-ID frequency bands. The wireless communication chip may signify a chip that performs communication according to various communication protocols such as the Institute of Electrical and Electronics Engineers (IEEE), Zigbee, 3rd generation (3G), 3rd generation partnership project (3GPP), long term evolution (LTE), and 5th generation (5G).

The voice and video input unit 150 may include a microphone 151 and a camera 153. The microphone 151 may receive and convert a user's voice or other sounds to audio data. The processor 120 may use the user's voice input through the microphone 151 for a video call or convert the user's voice to audio data and store the audio data in the memory 110. The camera 153 may capture a still video or motion video under the control of the user. The camera 153 may be a camera module located on the front surface or the rear surface of the terminal 100. The processor 120 may generate a video stream for a video call by using the voice input through the microphone 151 and the video captured by the camera 153.

The terminal 100 may be operated in a motion control mode or a voice control mode. When operated in a motion control mode, the processor 120 may activate the camera 153 to capture a user and track a motion change of the user, and perform a control operation corresponding thereto. When operated in a voice control mode, the processor 120 may analyze the user's voice input through the microphone 151, and perform a control operation according to an analyzed user's voice.

The names of the constituent elements of the terminal 100 may vary. Furthermore, according to the present disclosure, the terminal 100 may include at least one of the above-described constituent elements, or some constituent elements may be omitted or other additional constituent elements may be further included. The terminal 100 may perform the following operation by using at least one of the above-described constituent elements.

Figure 3:
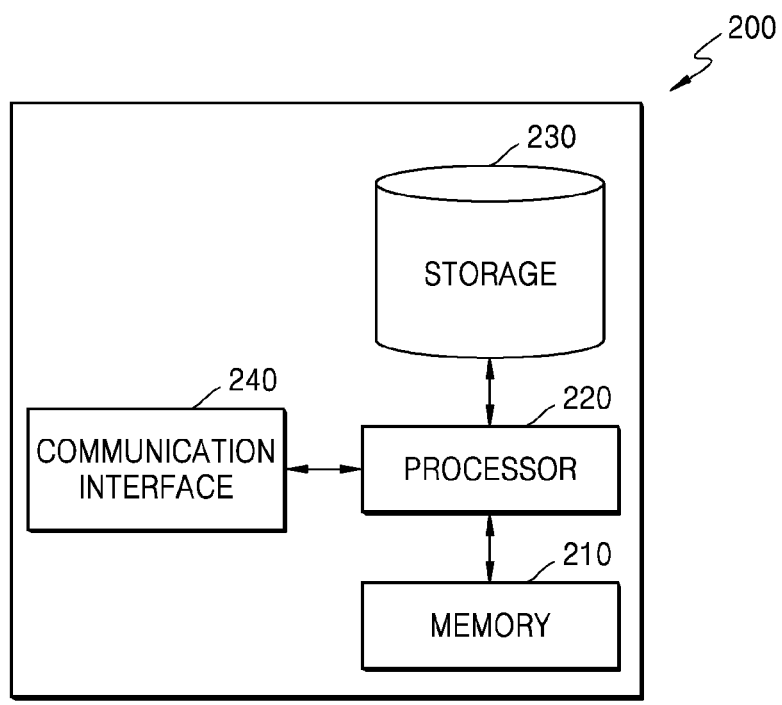
FIG. 3 is a block diagram of a configuration of a server for providing a video call service according to an embodiment.

FIG. 3 is a block diagram of a configuration of a server 200 for providing a video call service according to an embodiment.

Referring to FIG. 3, the server 200 for providing a video call service may include a memory 210, a processor 220, a storage 230, and a communication interface 240. A person having ordinary skill in the art related to the present embodiment may see that other general purpose elements may be included in addition to the constituent elements illustrated in FIG. 3. Each of the constituent elements of FIG. 3 may be separated, added, or omitted according to a method of implementing the server 200 for providing a video call service. In other words, according to the implementation method, one constituent element may be segmented into two or more constituent element, two or more constituent elements may be assembled into one constituent element, or some constituent elements may be further added or removed.

The memory 210 may store instructions that are executable by the processor 220. The memory 210 may store software or a program.

The processor 220 may execute the instructions stored in the memory 210. The processor 220 may control overall operations of the server 200 for providing a video call service. The processor 220 may obtain information and requests received through the communication interface 240, and store the received information in the storage 230. Furthermore, the processor 220 may process the received information. For example, the processor 220 may generate information used for a video call service from the information received from the terminal 100 or perform a process to manage the received information, and store the information in the storage 230. Furthermore, the processor 220, in response to the request obtained from the terminal 100, may transmit information for providing a video call service to the terminal 100 through the communication interface 240, by using the information stored in the storage 230.

The storage 230 may store various software and information needed for providing a video call service by the server 200. For example, the storage 230 may store programs and applications executed on the server 200 for providing a video call service, and various data used for a video call service.

The storage 230 may store and manage a database of personal information for each user using a video call service. The storage 230 may store personal information of a user for each account for accessing the server 200 for providing a video call service and various pieces of information used for a video call service.

The communication interface 240 may perform communication with an external device including the terminal 100. For example, the server 200 for providing a video call service may receive, from the terminal 100, a video call service start request and a request for setting information to establish a video call service environment, and provide information related to the video call service, in response to the request of the terminal 100.

The server 200 for providing a video call service may receive the icon information corresponding to a facial expression of a user using the video call service, through the communication interface 240. The storage 230 of the server 200 for providing a video call service may store a plurality of types of icon information of a plurality of users using the video call service, for each user account.

Accumulated icon information may be information obtained by accumulating the icon information received from the terminal 100. The icon information may be information about an icon corresponding to a facial expression of a user using a video call service which is detected from a first video stream that captures a first user or from a second video stream that captures a second user.

The personal information may include personal information such as nationality, name, gender, interest of a user using a video call service.

Virtual property information may be virtual property for using a paid additional service by a user using a video call service. For example, a user may pay a certain account of virtual property in order to have a video call match with a counterpart meeting a user's desired condition. The virtual property may be directly purchased by the user, or may be exchanged from the accumulated icon information corresponding to the user account that the user acquired. In this state, the server 200 for providing a video call service may calculate virtual property from the accumulated icon information corresponding to the user account, by varying a weight according to the type of the icon information.

The server 200 for providing a video call service may transmit the accumulated icon information or the virtual property information to the terminal 100 through the communication interface 240.

Figure 4:
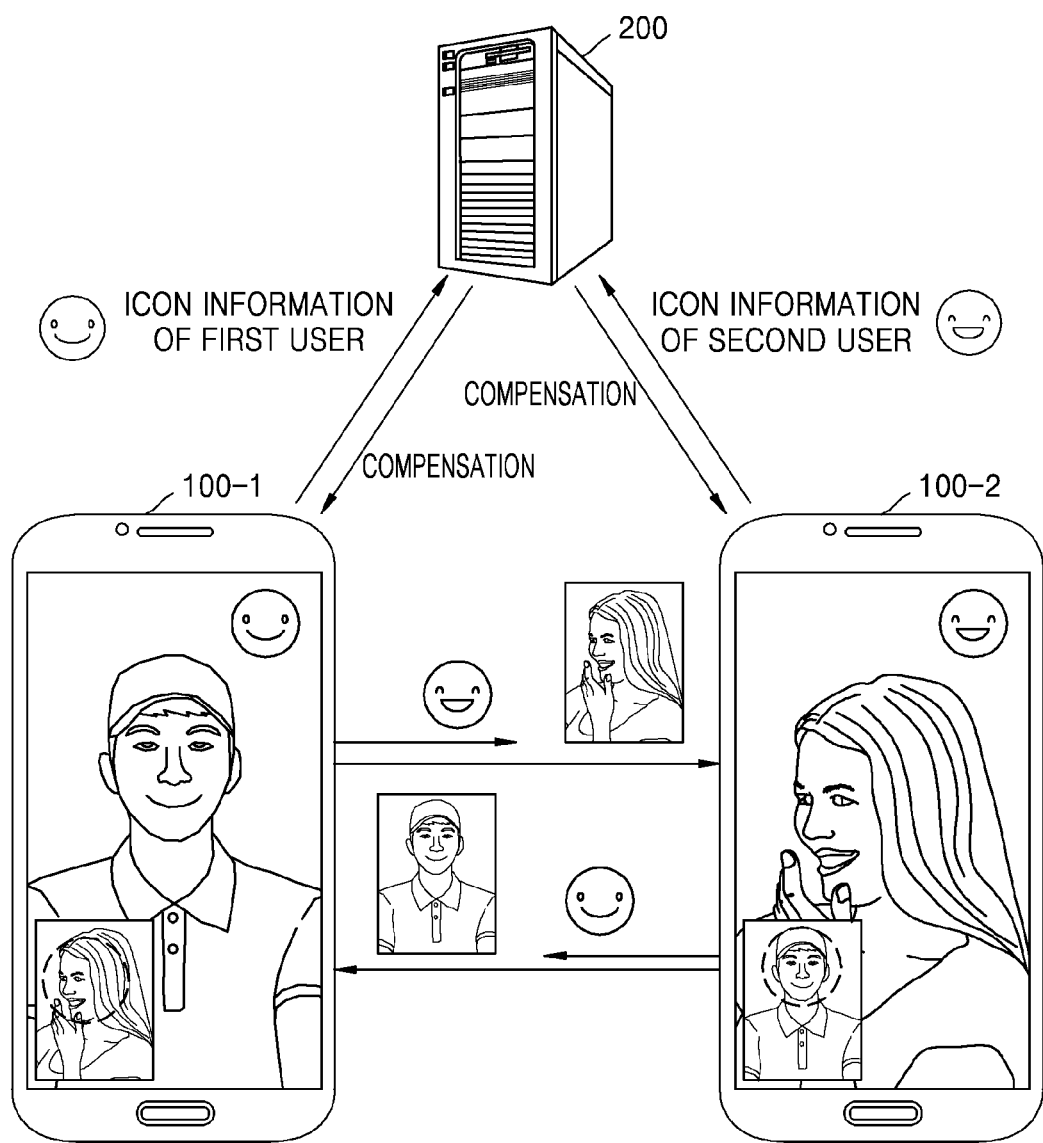
FIG. 4 illustrates a process of transmitting icon information corresponding to a facial expression of a first user from a first terminal to a second terminal and receiving compensation from a server based on icon information received from the second terminal, according to an embodiment.

FIG. 4 illustrates a process of transmitting icon information corresponding to a facial expression of the first user from a first terminal 100-1 to a second terminal 100-2 and receiving compensation from the server 200 based on icon information received from the second terminal 100-2, according to an embodiment.

Referring to FIG. 4, the first user and the second user, who is a counterpart in the video call, may perform a video call through the first terminal 100-1 and the second terminal 100-2, respectively. An application for executing a video call service provided by a video call service provider may be installed on each of the first terminal 100-1 and the second terminal 100-2. The first terminal 100-1 and the second terminal 100-2 may execute the application for executing a video call service to be connected to the server 200 for providing a video call service, and receive the video call service provided by the server 200. The first terminal 100-1 and the second terminal 100-2 may provide the video call service provided by the server 200 to the first user and the second user, respectively.

The first terminal 100-1 may transmit a request to use a video call service to the server 200 for providing a video call service. The server 200 for providing a video call service, in response to the request to use a video call service by the first terminal 100-1, may provide information needed for a video call to the first terminal 100-1 to allow a video call with the second terminal 100-2 of the second user who is the counterpart in the video call. The server 200 for providing a video call service, in response to the request to use a video call service by the first terminal 100-1, may randomly select a counterpart in the video call, select a counterpart according to a certain rule, or select one who is designated by the first user as a counterpart. The first terminal 100-1 of the first user and the second terminal 100-2 of the second user may establish a video call session therebetween for a video call.

When a video call session is established between the first terminal 100-1 and the second terminal 100-2, a first video stream that captures the first user may be transmitted from the first terminal 100-1 to the second terminal 100-2, and a second video stream that captures the second user may be transmitted from the second terminal 100-2 to the first terminal 100-1. The first terminal 100-1 may receive the second video stream from the second terminal 100-2, and the second terminal 100-2 may receive the first video stream from the first terminal 100-1. The first terminal 100-1 may obtain the first video stream that captures the first user or the second video stream that captures the second user, which is received from the second terminal 100-2. The second terminal 100-2 may obtain the second video stream that captures the second user or receive the first video stream that captures the first user, from the first terminal 100-1.

Figure 5:
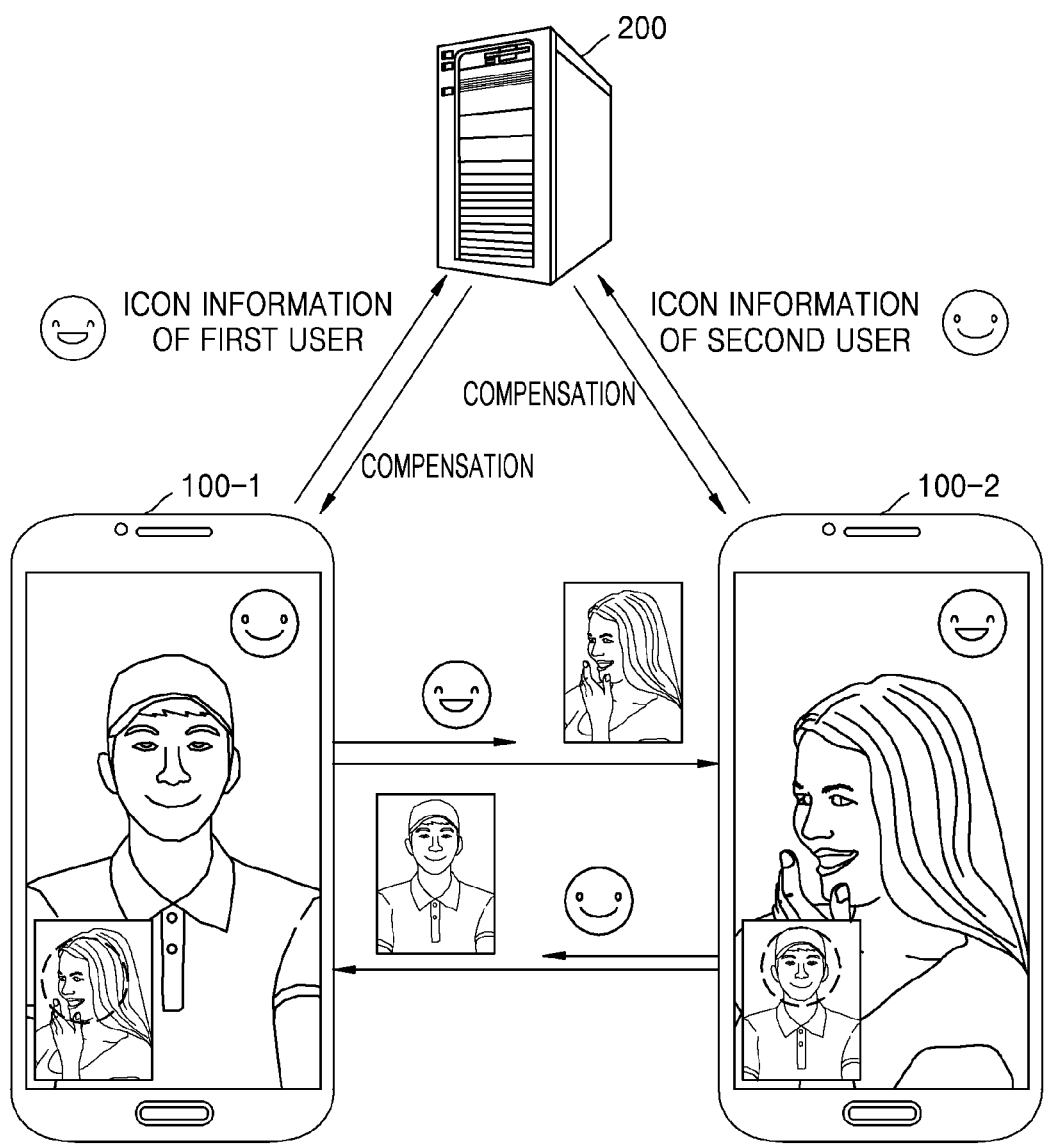
FIG. 5 illustrates a process of transmitting icon information corresponding to a facial expression of the first user from the first terminal to the second terminal and receiving compensation from the server based on the icon information transmitted from the first terminal, according to an embodiment.

The first terminal 100-1 may display a video of the second user based on the second video stream on a screen of the first terminal 100-1, and display a video of the first user based on the first video stream in a partial area of the screen on which the video of the second user is displayed. The second terminal 100-2 may display a video of the first user based on the first video stream on a screen of the second terminal 100-2, and display a video of the second user based on the second video stream in a partial area of the screen on which the video of the first user is displayed. As illustrated in FIG. 5, the first terminal 100-1 may display the video of the second user on the screen of the first terminal 100-1 and simultaneously display the video of the first user in a partial area of the screen of the first terminal 100-1 in a size smaller than the size of the video of the second user. The second terminal 100-2 may display the video of the first user on the screen of the second terminal 100-2 and simultaneously display the video of the second user in a partial area of the screen of the second terminal 100-2 in a size smaller than the size of the video of the first user.

Since the operations of and the functions on the applications of the first terminal 100-1 and the second terminal 100-2 are the same, the first terminal 100-1 is mainly described below, but the description of the second terminal 100-2 is omitted.

When a video call service is performed between the first terminal 100-1 and the second terminal 100-2, the first terminal 100-1 may detect the facial expression of the first user from the first video stream that captures the first user.

A facial expression may be a movement of, for example, an eye, an eyebrow, a nose, a mouth, a forehead, or a cheek of a user's face, to express one's thought. For example, the facial expression may be a movement on a face according to at least one action of opening the eyes wide, closing the eyes, raising corners of the lips, opening the mouth, sticking out the lips, and winking. A user may deliver one's opinion to a counterpart or induce a reaction from the counterpart by making a facial expression. When a user makes a favorable or positive facial expression, the mood of a video call with the counterpart may become favorable or positive.

Referring to FIG. 4, the first terminal 100-1 displays a video in which the second user smiles, on the screen of the first terminal 100-1, and displays a video in which the first user laughs, in a lower left area of the screen in which the video of the second user is displayed. The first terminal 100-1 may detect a laughing facial expression of the first user from the first video stream that captures the first user. The first terminal 100-1 may detect the facial expression of the first user from the first video stream based on a feature on a face of the first user in the first video stream. The first terminal 100-1 may continuously detect the first user's facial expression in real time or at a certain time interval.

The first terminal 100-1 may generate icon information corresponding to the detected facial expression of the first user. Each facial expression may have corresponding icon information. The icon information may be an intuitive illustration of a facial expression as a similar figure or a picture or a symbol indicating emotion information corresponding to the facial expression of the user. For example, the emotion information may include joy, happiness, pleasure, satisfaction, smile, laughter, wink, positiveness, and good (accept). For example, the icon information may include a picture of a shape or pattern corresponding to the user's facial expression, or include a symbol or a character expressing the emotion information.

Referring to FIG. 4, the first terminal 100-1 may transmit icon information of a "laughing face icon" corresponding to the detected laughing facial expression of the first user to the second terminal 100-2 of the second user who is a counterpart of the first user. Since the facial expression that the first user makes may be a response to the attitude or action of the second user, when the facial expression of the first user is detected from the first video stream, the icon information is transmitted to the second user who made the detected facial expression. As the icon information corresponding to the facial expression of the first user is fed back to the second user, a positive conversation and a positive mood may be induced between the users conducting a video call. The "laughing face icon" may be displayed overlapping the area where the first video stream is displayed in the second terminal 100-2, according to the icon information transmitted to the second terminal 100-2. The second terminal 100-2 may transmit the icon information of the second user including the received icon information to the server 200 for providing a video call service. The icon information of the second user may be information about icons that the second user acquired and may include the type and number of icons. The second terminal 100-2, in response to the transmission of the icon information of the second user, may receive virtual property information that is usable for the video call service, from the server 200. In other words, the second user may receive virtual property that is useable for the video call service, as compensation for making the first user to laugh.

Referring to FIG. 4, the first terminal 100-1 may receive icon information corresponding to the facial expression of the second user detected from the second video stream that captures the second user, from the second terminal 100-2. For example, the icon information corresponding to the facial expression of the second user may be a "smiling facial expression". The first terminal 100-1 may transmit the icon information of the first user including the icon information received from the second terminal 100-2, to the server 200. The icon information of the first user is information about icons that the first user acquired, and may include the type and/or number of icons. The first terminal 100-1 may receive virtual property information usable for a video call from the server 200, as a response to the transmission of the icon information of the first user. The first user may receive virtual property usable for a video call as compensation for allowing the second user to make a laughing facial expression.

The same descriptions as those presented in FIG. 4 are omitted in the following embodiments.

FIG. 5 illustrates a process of transmitting the icon information corresponding to the facial expression of the first user from the first terminal 100-1 to the second terminal 100-2 and receiving compensation from the server 200 based on the icon information transmitted from the first terminal 100-1, according to an embodiment.

The embodiment of FIG. 5 is different from the embodiment of FIG. 4 in the process of receiving compensation from server 200.

Referring to FIG. 5, the first terminal 100-1 may transmit the icon information of the first user including the icon information transmitted to the second terminal 100-2, to the server 200 for providing a video call service. The first terminal 100-1 may receive the virtual property information usable for a video call, as a response to the transmission of the icon information of the first user, from the server 200. In other words, unlike FIG. 4, FIG. 5 illustrates that the user using a video call service is induced to frequently make a facial expression, by providing virtual property usable for a video call as compensation for allowing the first user to make a laughing facial expression.

Figure 6:
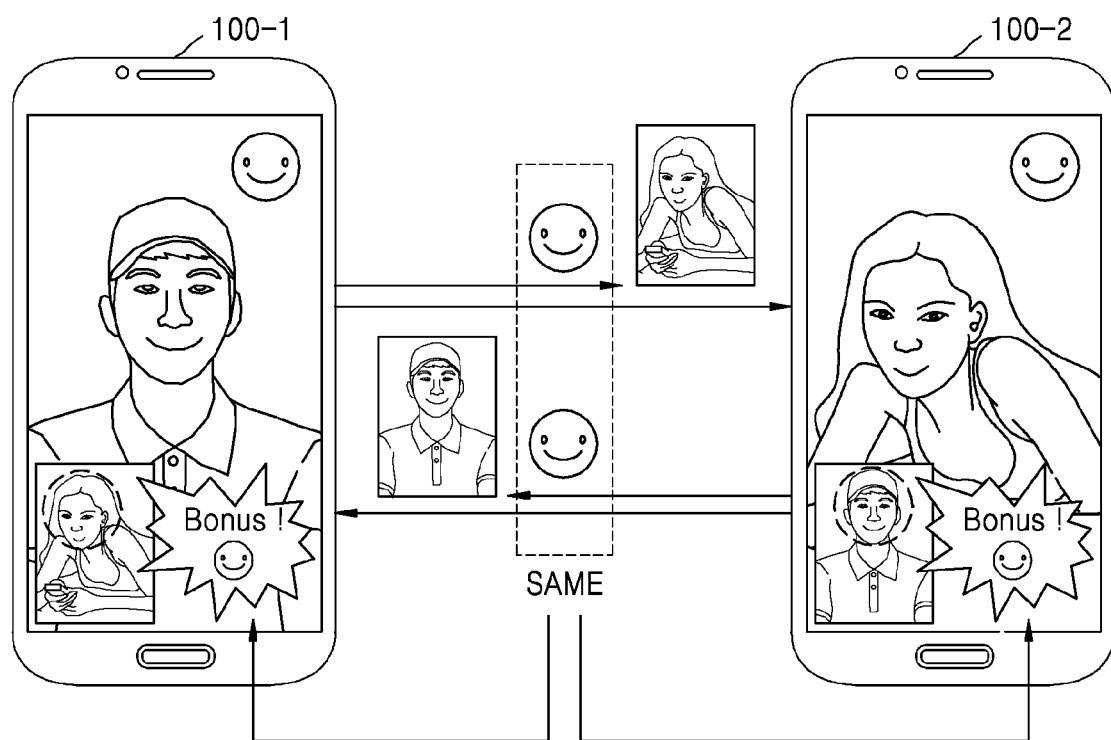
FIG. 6 illustrates a process in which the first terminal generates bonus icon information when the icon information received and the icon information transmitted in the first terminal are the same, according to an embodiment.

FIG. 6 illustrates a process in which the first terminal 100-1 generates bonus icon information when the icon information received and the icon information transmitted in the first terminal 100-1 are the same, according to an embodiment.

Referring to FIG. 6, the first terminal 100-1 may generate a "smile icon" corresponding to the facial expression of the first user detected from the first video stream that captures the first user, as icon formation, and transmitting the smile icon to the second terminal 100-2. The second terminal 100-2 may generate a "smile icon" corresponding to the facial expression of the second user detected from the second video stream that captures the second user, as icon information, and transmit the smile icon to the first terminal 100-1.

The first terminal 100-1 may receive the icon information corresponding to the facial expression of the second user detected from the second video stream that captures the second user, from the second terminal 100-2. The first terminal 100-1 may update the icon information of the first user when the icon information received from the second terminal 100-2 and the icon information transmitted to the second terminal 100-2 are the same. For example, the first terminal 100-1 may generate bonus icon information. The "bonus icon information" may mean the type and/or number of icons that the user separately or continuously additionally acquires when a certain condition is met. The first terminal 100-1 may display the generated bonus icon information in a partial area of the screen. The second terminal 100-2 may receive the icon information corresponding to the facial expression of the first user detected from the first video stream that captures the first user, from the first terminal 100-1. The second terminal 100-2 may update the icon information of the second user when the icon information received from the first terminal 100-1 and the icon information transmitted to the first terminal 100-1 are the same. For example, the second terminal 100-2 may generate bonus icon information. The second terminal 100-2 may display the generated bonus icon information in a partial area of the screen.

The first terminal 100-1 may transmit the icon information of the first user updated based on the icon information and the bonus icon information that the first user acquired, to the server 200. The updated icon information of the first user may include the type of icons and/or a total number of the number of icons and the number of bonus icons for each icon types. The first terminal 100-1 may receive the virtual property information usable for a video call from the server 200, as a response to the transmission of the updated icon information of the first user. Since the virtual property is additionally paid as much as the bonus icon information is additionally acquired, the first user may receive further compensation.

The second terminal 100-2 may transmit the icon information of the second user updated based on the icon information and the bonus icon information that the second user acquired, to the server 200. The updated icon information of the second user may include the type of icons and/or a total number of the number of icons and the number of bonus icons for each icon types. The second terminal 100-2 may receive the virtual property information usable for a video call from the server 200, as a response to the transmission of the updated icon information of the second user. Since the virtual property information is additionally paid as much as the bonus icon information is additionally acquired, the second user may receive further compensation.

Figure 7:
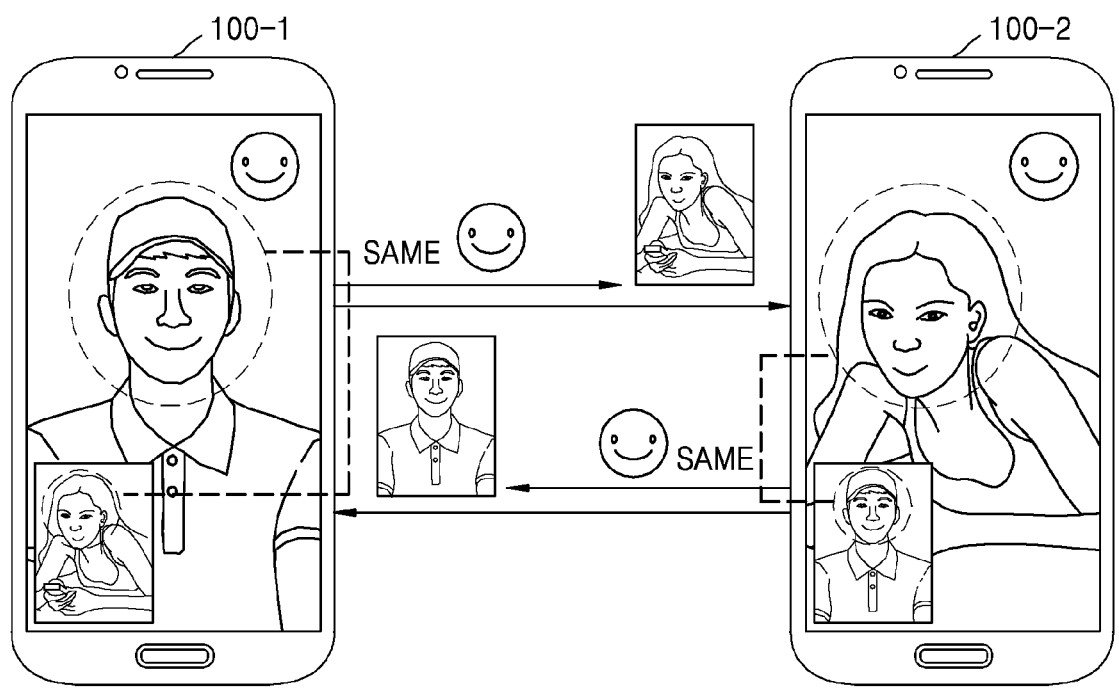
FIG. 7 illustrates a process of generating icon information when the facial expression of the first user and a facial expression of the second user, which are detected by the first terminal, are the same, according to an embodiment.

FIG. 7 illustrates a process of generating icon information when the facial expression of the first user and a facial expression of the second user, which are detected by the first terminal 100-1, are the same, according to an embodiment.

Referring to FIG. 7, the first terminal 100-1 may detect the facial expression of the first user from the first video stream that captures the first user, and detect the facial expression of the second user from the second video stream that captures the second user received from the second terminal 100-2. The first terminal 100-1 may generate the icon information corresponding to the detected facial expression of the first user when the facial expression of the first user detected from the first video stream and the facial expression of the second user detected from the second video stream are the same. As illustrated in FIG. 7, since the facial expression of the first user detected from the first video stream and the facial expression of the second user detected from the second video stream are the same as a "laughing facial expression", the first terminal 100-1 may generate a "smile icon" corresponding to the "laughing facial expression" as the icon information, and transmit the generated "smile icon" to the second terminal 100-2.

The second terminal 100-2 may detect the facial expression of the second user from the second video stream that captures the second user, and detect the facial expression of the first user from the first video stream that captures the first user received from the first terminal 100-1. The second terminal 100-2 may generate the icon information corresponding to the detected facial expression of the second user when the facial expression of the second user detected from the second video stream and the facial expression of the first user detected from the first video stream are the same. As illustrated in FIG. 7, since the facial expression of the second user detected from the second video stream and the facial expression of the first user detected from the first video stream are the same as a "laughing facial expression", the second terminal 100-2 may generate a "smile icon" corresponding to the "laughing facial expression" as the icon information, and transmit the generated "smile icon" to the first terminal 100-1.

Figure 8:
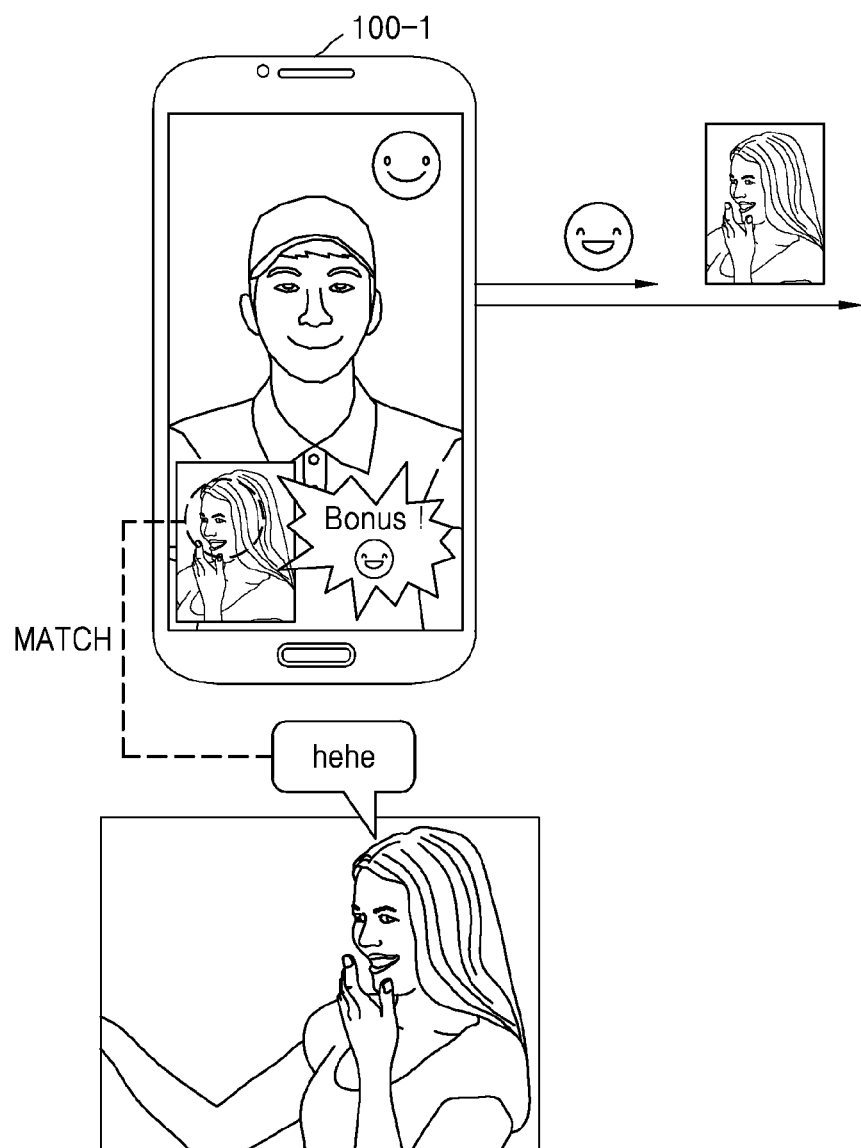
FIG. 8 illustrates a process in which the first terminal generates bonus icon information when a facial expression and predetermined voice of the first user, which are detected by the first terminal, are matched with each other, according to an embodiment.

FIG. 8 illustrates a process in which the first terminal 100-1 generates bonus icon information when a facial expression and predetermined voice of the first user, which are detected by the first terminal 100-1, are matched with each other, according to an embodiment.

Referring to FIG. 8, the first terminal 100-1 may receive voice of the first user. The first terminal 100-1 may detect not only the facial expression of the first user from the first video stream, but also predetermined voice from the first user's voice. The predetermined voice may be matched in advance corresponding to each facial expression. For example, the first terminal 100-1 may check from the first user's voice whether voice such as "hehe" or "HaHa" is detected with respect to the "laughing facial expression".

The first terminal 100-1 may update the icon information of the first user when the facial expression of the first user detected from the first video stream and the predetermined voice detected from the first user's voice are matched with each other. For example, the first terminal 100-1 may generate bonus icon information. As illustrated in FIG. 7, the first terminal 100-1 may detect the "laughing facial expression" of the first user from the first video stream, and check whether the "laughing facial expression" of the first user matches the predetermined voice of "hehe". When the "laughing facial expression" and the predetermined voice of "hehe" are matched with each other, the first terminal 100-1 may generate bonus icon information. The first terminal 100-1 may display the generated bonus icon information in a partial area of the screen.

The first terminal 100-1 may transmit the icon information of the first user updated based on the icon information and the bonus icon information that the first user acquired, to the server 200. The updated icon information of the first user may include the type of icons and/or a total of the number of icons and the number of bonus icons for each icon type. The first terminal 100-1 may receive the virtual property information usable for a video call from the server 200, as a response to the transmission of the updated icon information of the first user. Since virtual property information is additionally paid as much as the bonus icon information is additionally accumulated, the first user may be further compensated.

Figure 9:
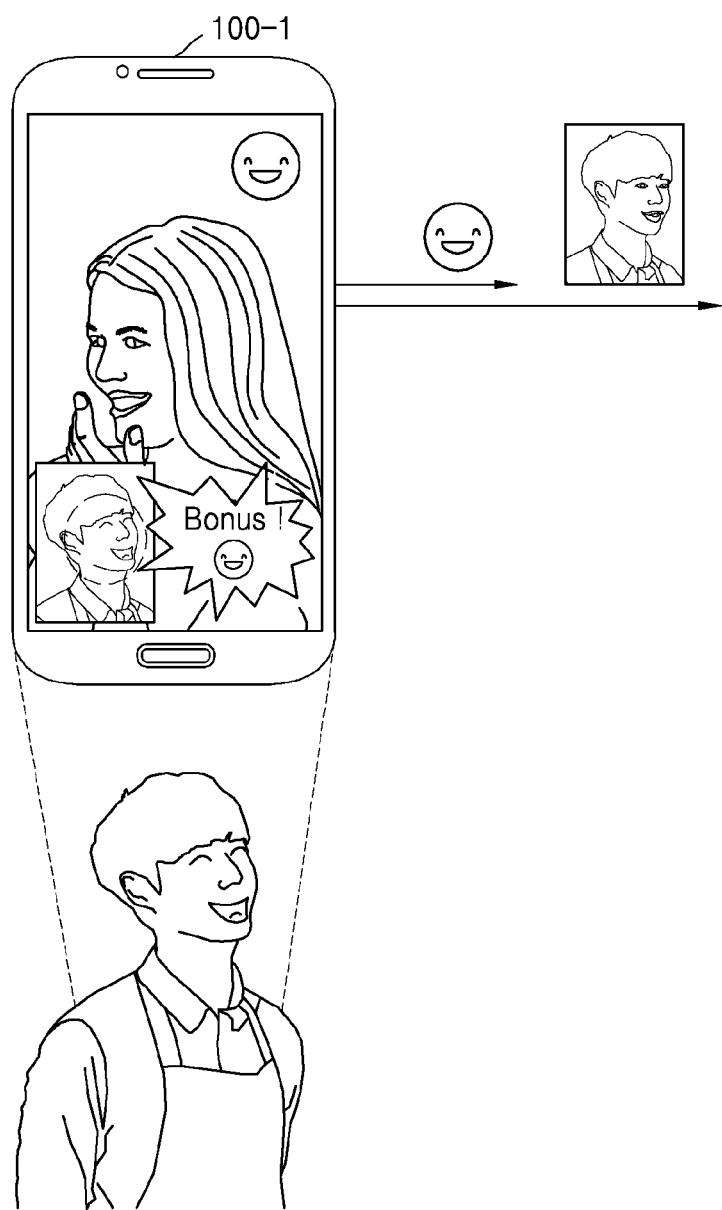
FIG. 9 illustrates a process of generating bonus icon information according to the intensity of a facial expression when the facial expressions of the first user are continuously detected in the first terminal, and transmitting the generated bonus icon information to the second terminal, according to an embodiment.

FIG. 9 illustrates a process of generating bonus icon information according to the intensity of a facial expression when the facial expressions of the first user are continuously detected in the first terminal 100-1, and transmitting the generated bonus icon information to the second terminal 100-2, according to an embodiment.

Referring to FIG. 9, the first terminal 100-1 may continuously detect the facial expression of the first user from the first video stream. As illustrated in FIG. 9, the first terminal 100-1 may continuously detect the "laughing facial expression" of the first user from the first video stream and then a "loudly laughing facial expression" of the first user. When the "loudly laughing facial expression" having a relatively high intensity of the facial expression is detected, the first terminal 100-1 may generate more icon information than when the "laughing facial expression" having a relatively low intensity of the facial expression is detected, and transmit the more icon information to the second terminal 100-2.

For example, the first terminal 100-1 may recognize the intensity of a facial expression by comparing a threshold value with a value corresponding to a distance difference between feature points corresponding to each other in no facial expression of the first user and a detected facial expression such as the "laughing facial expression" or the "loudly laughing facial expression" of the first user. In this state, at least one threshold value may exist. The first terminal 100-1 may update the icon information corresponding to the detected facial expression of the first user based on the recognized intensity of the facial expression.

For example, the first terminal 100-1 may transmit icon information corresponding to the "laughing facial expression" of the first user, for example, a laughing face icon, to the second terminal 100-2. Then, the first terminal 100-1 may transmit icon information corresponding to the "loudly laughing facial expression" of the first user, for example, a laughing face icon, to the second terminal 100-2. In this state, the first terminal 100-1 may update the laughing face icon base on the intensity of the "loudly laughing facial expression", and additionally transmit the updated laughing face icon as bonus icon information to the second terminal 100-2. When the first user makes a laughing facial expression, the first terminal 100-1 may transmit icon information about the laughing face icon to the second terminal 100-2. When the first user makes a loudly laughing facial expression, the first terminal 100-1 may transmit not only the icon information about the laughing face icon, but also bonus icon information, to the second terminal 100-2.

The second terminal 100-2 may transmit the icon information of the second user updated based on the icon information and the bonus icon information that the second user acquired, to the server 200. The updated icon information of the second user may include the type of icons and/or a total of the number of icons and the number of bonus icons for each icon type. The second terminal 100-2 may receive the virtual property information usable for a video call from the server 200, as a response to the transmission of the updated icon information of the second user. Since virtual property information is additionally paid as much as the bonus icon information is additionally accumulated, the second user who allows the first user to make a specific facial expression having a high intensity of a facial expression may be further compensated.

Figure 10:
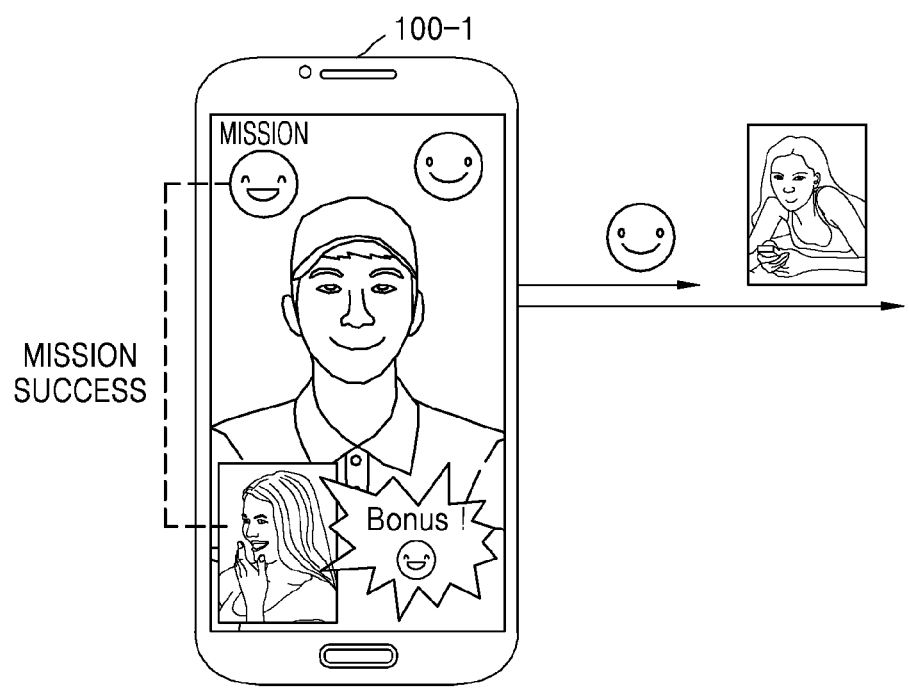
FIG. 10 illustrates a process in which the first terminal generates bonus icon information when the same icon information as mission icon information is generated in the first terminal, according to an embodiment.

FIG. 10 illustrates a process in which the first terminal 100-1 generates bonus icon information when the same icon information as mission icon information is generated in the first terminal 100-1, according to an embodiment.

Referring to FIG. 10, the first terminal 100-1 may display mission icon information on the screen of the first terminal 100-1. As illustrated in FIG. 10, the "laughing face icon" may be displayed, as mission icon information, on the screen of the first terminal 100-1.

The first terminal 100-1 may update the icon information of the first user when the icon information corresponding to the facial expression of the first user detected from the first video stream and the displayed mission icon information are the same. For example, the first terminal 100-1 may generate bonus icon information. As illustrated in FIG. 10, the first terminal 100-1 may generate bonus icon information according to mission success when the "laughing face icon" corresponding to the facial expression of the first user detected from the first video stream is generated as the icon information. The first terminal 100-1 may display the generated bonus icon information in a partial area of the screen.

The first terminal 100-1 may transmit the icon information of the first user updated based on the icon information and the bonus icon information that the first user acquired, to the server 200. The updated icon information of the first user may include the type of icons and/or a total of the number of icons and the number of bonus icons for each icon type. The first terminal 100-1 may receive the virtual property information usable for a video call from the server 200, as a response to the transmission of the updated icon information of the first user. Since virtual property information is additionally paid as much as the bonus icon information is additionally accumulated, the first user may be further compensated.

Figure 11:
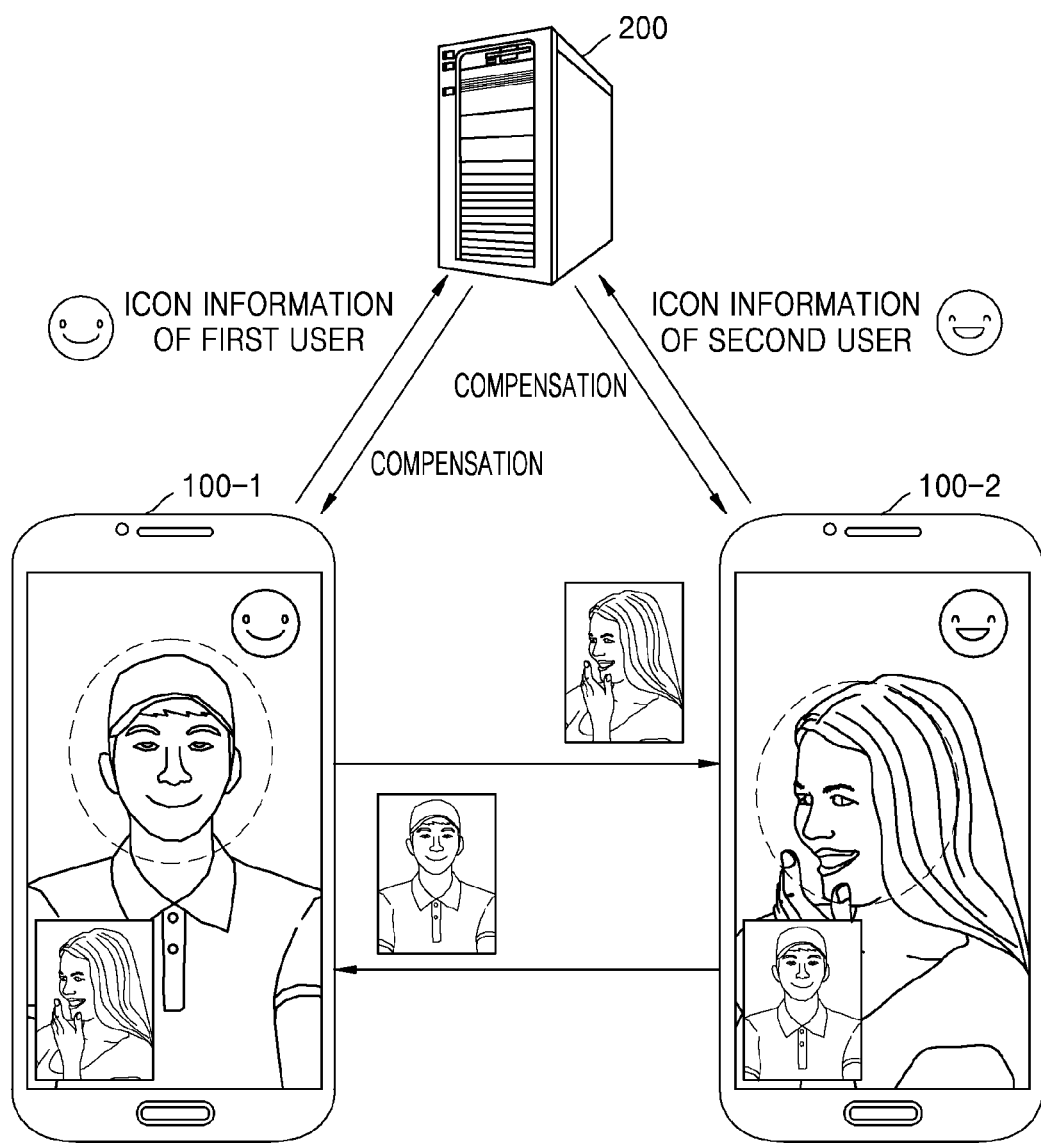
FIG. 11 illustrates a process in which the first terminal displays icon information corresponding to the facial expression of the second user in the first terminal, and receiving compensation from the server based on the icon information displayed in the first terminal, according to an embodiment.

FIG. 11 illustrates a process in which the first terminal 100-1 displays icon information corresponding to the facial expression of the second user, and receives compensation from the server 200 based on the icon information displayed in the first terminal 100-1, according to an embodiment.

Referring to FIG. 11, when a video call service is conducted between the first terminal 100-1 and the second terminal 100-2, the first terminal 100-1 may detect the facial expression of the second user from the second video stream that captures the second user and is received from the second terminal 100-2.

Referring to FIG. 11, the first terminal 100-1 may display a video in which the second user smiles on the screen of the first terminal 100-1, and a video in which the first user laughs in the lower left area of the screen where the video of the second user is displayed. The first terminal 100-1 may detect a smiling facial expression of the second user from the second video stream that captures the second user. The first terminal 100-1 may detect the facial expression of the second user from the second video stream based on a feature on the face of the second user from the second video stream. The first terminal 100-1 may continuously detect the facial expression of the second user in real time or at a predetermined time interval.

The first terminal 100-1 may generate icon information corresponding to the detected facial expression of the second user.

Referring to FIG. 11, the first terminal 100-1 may display on the screen of the first terminal 100-1 icon information of "smile icon" corresponding to the detected smiling facial expression of the second user. Since the facial expression that the second user makes is a response to the attitude or action of the first user, when the facial expression of the second user is detected from the second video stream, the detected facial expression is displayed on the screen of the first user who caused the detected facial expression. The first terminal 100-1 may display the icon information generated by the first terminal 100-1 overlapping the area where the second video stream is displayed. Since the icon information is generated by the first terminal 100-1 based on the facial expression of the second user detected from the second video stream, a positive conversation and a positive facial expression may be induced between the users conducting a video call by giving feedback to the first user as the icon information corresponding to the facial expression of the second user. Referring to FIG. 11, since the icon information of "smile icon" corresponding to the smiling facial expression of the second user is generated by the first terminal 100-1, the "smile icon" may be displayed in the first terminal 100-1 overlapping the area where the second video stream is displayed. Accordingly, the first user may see that the icon information corresponding to the smiling facial expression generated as the second user who is the counterpart in the video call makes a smiling facial expression is obtained.

The first terminal 100-1 may transmit the icon information of the first user including the icon information displayed on the first terminal 100-1, to the server 200 for providing a video call service. The first terminal 100-1 may transmit the icon information of the first user to the server 200 for providing a video call service by matching the transmitted icon information with the first user's account. As illustrated in FIG. 11, the first terminal 100-1 may transmit the icon information corresponding to the facial expression of the second user detected from the second stream, to the server 200 for providing a video call service. The first terminal 100-1 may transmit the icon information of the first user including the displayed icon information, to the server 200 for providing a video call service. The first terminal 100-1 may receive the virtual property information usable for a video call service from the server 200, as a response to the transmission of the icon information of the first user.

Referring to FIG. 11, when the first user laughs, the second terminal 100-2 may detect the laughing facial expression of the first user from the first video stream that captures the first user, generate the icon information of "laughing face icon" corresponding to the laughing facial expression, and display the generated icon information on the screen of the second terminal 100-2. The icon information of "laughing face icon" corresponding to the laughing facial expression of the first user may be displayed overlapping the area of in the second terminal 100-2 where the first video stream is displayed. Accordingly, the second user may see that, as the first user makes laughing facial expression, the icon information corresponding to the laughing facial expression is obtained. The second terminal 100-2 may transmit the icon information of the second user including the icon information displayed on the screen of the second terminal 100-2, to the server 200 for providing a video call service. The second terminal 100-2 may receive the virtual property information usable for a video call service from the server 200, as a response to the transmission of the icon information of the second user. In other words, the second user may receive the virtual property information usable for a video call service as a compensation for allowing the first user to make a laughing facial expression.

Figure 12:
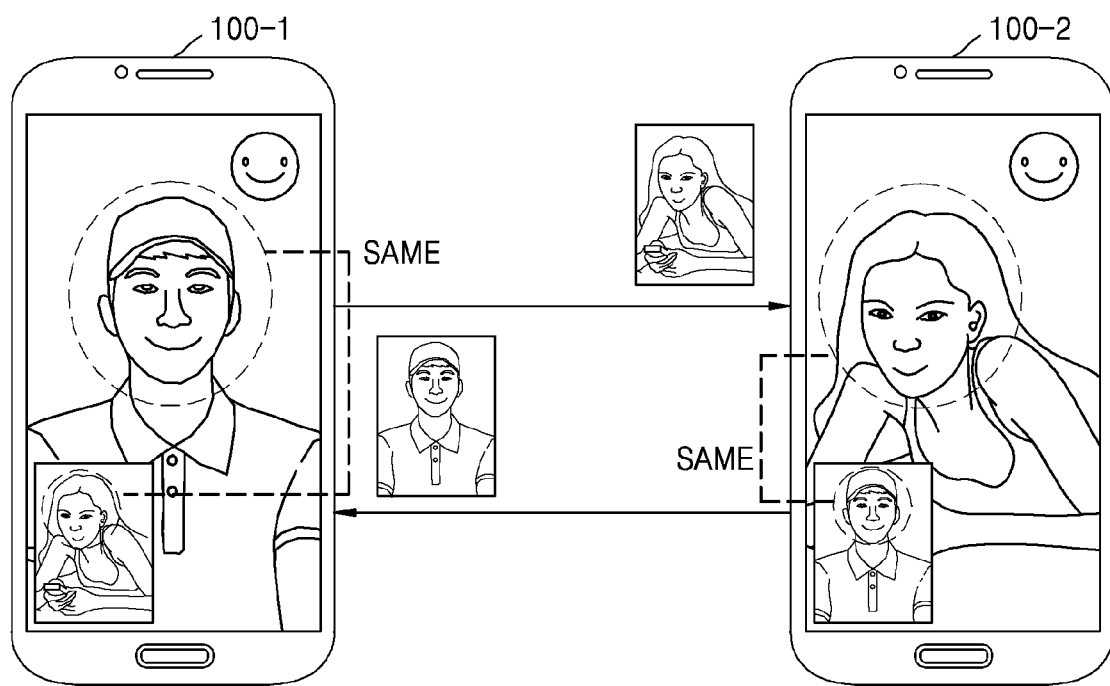
FIG. 12 illustrates a process of generating icon information when the facial expression of the second user and the first user's facial expression, which are detected by the first terminal, are the same, according to an embodiment.

FIG. 12 illustrates a process of generating icon information when the facial expression of the second user and the first user's facial expression, which are detected by the first terminal 100-1, are the same, according to an embodiment Referring to FIG. 12, the first terminal 100-1 may detect the facial expression of the first user from the first video stream that captures the first user, and detect the facial expression of the second user from the second stream that captures the second user received from the second terminal 100-2. The first terminal 100-1 may generate the icon information corresponding to the detected facial expression of the second user when the facial expression of the first user detected from the first video stream and the facial expression of the second user detected from the second stream are the same. As illustrated in FIG. 12, since the facial expression of the second user detected from the second stream and the facial expression of the first user detected from the first video stream are the same as the "smiling facial expression", the first terminal 100-1 may generate the "smile icon" corresponding to the "smiling facial expression" as the icon information, and display the generated icon information on the screen of the first terminal 100-1.

The second terminal 100-2 may detect the facial expression of the second user from the second stream that captures the second user, and detect the facial expression of the first user from the first video stream that captures the first user and is received from the first terminal 100-1. The second terminal 100-2 may generate the icon information corresponding to the detected facial expression of the first user when the facial expression of the second user detected from the second stream and the facial expression of the first user detected from the first video stream are the same. As illustrated in FIG. 12, since the facial expression of the first user detected from the first video stream and the facial expression of the second user detected from the second stream are the same as the "smiling facial expression", the second terminal 100-2 may generate the "smile icon" corresponding to the "smiling facial expression" as the icon information, and display the generated icon information on the screen of the second terminal 100-2.

Figure 13:
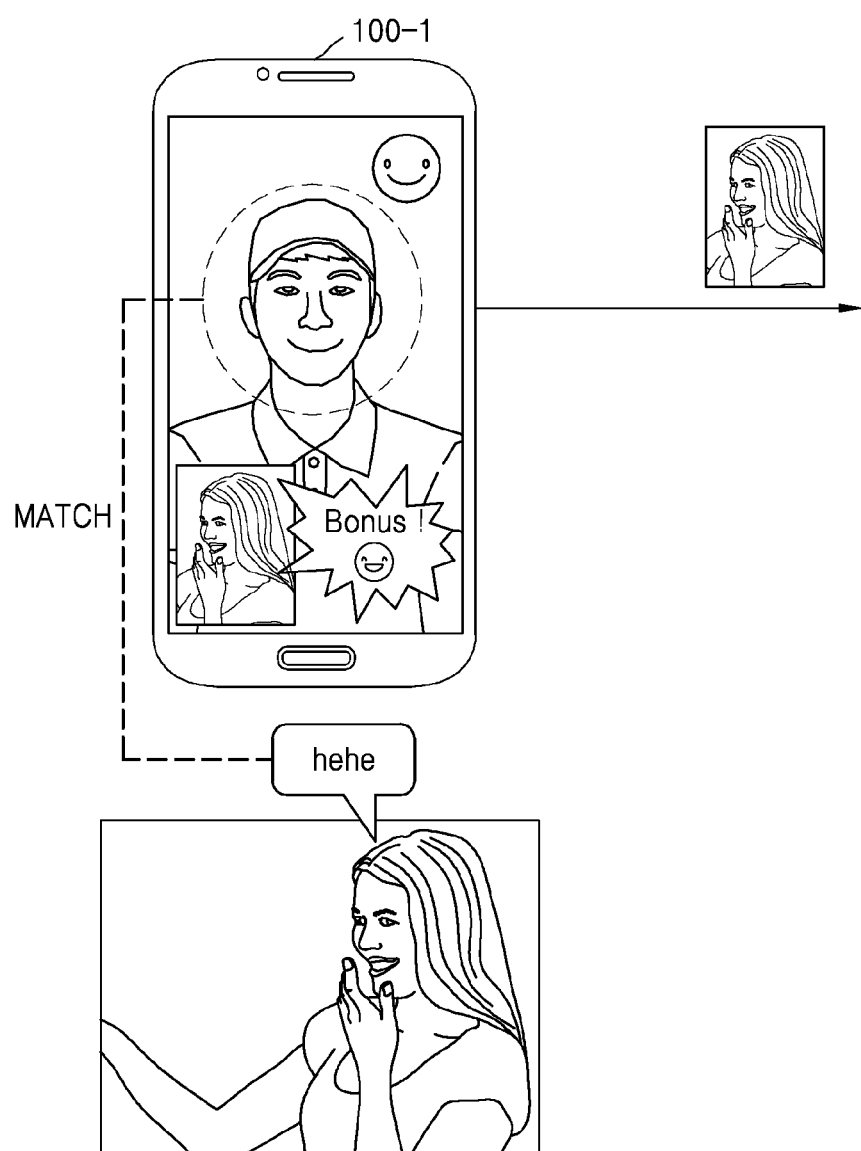
FIG. 13 illustrates a process in which the first terminal generates bonus icon information when the facial expression of the second user and the first user's predetermined voice, which are detected by the first terminal, are matched with each other, according to an embodiment.

FIG. 13 illustrates a process in which the first terminal 100-1 generates bonus icon information when the facial expression of the second user and the first user's predetermined voice, which are detected by the first terminal 100-1, are matched with each other, according to an embodiment.

Referring to FIG. 13, the first terminal 100-1 may receive the first user's voice. The first terminal 100-1 may detect predetermined voice from the first user's voice. The predetermined voice may be matched in advance corresponding to each facial expression of a counterpart. For example, the first terminal 100-1 may check from the first user's voice whether the first user's voice such as "hehe" or "HaHa" with respect to the "smiling facial expression" of the second user.

The first terminal 100-1 may update the icon information of the first user when the facial expression of the second user detected from the second stream and the predetermined voice detected from the first user's voice that is input are matched with each other. For example, the first terminal 100-1 may generate bonus icon information. As illustrated in FIG. 13, the first terminal 100-1 may detect the "smiling facial expression" of the second user from the second stream, and check whether the detected "smiling facial expression" of the second user matches with the predetermined voice of "hehe" of the first user. Then, when the "smiling facial expression" and the predetermined voice of "hehe" are matched with each other, the first terminal 100-1 may generate bonus icon information. The first terminal 100-1 may display the generated bonus icon information in the partial area of the screen of the first terminal 100-1.

The first terminal 100-1 may transmit the icon information of the first user updated based on the icon information and the bonus icon information that the first user acquired, to the server 200. The updated icon information of the first user may include the type of icons and/or a total of the number of icons and the number of bonus icons for each icon type. The first terminal 100-1 may receive the virtual property information usable for a video call from the server 200, as a response to the transmission of the updated icon information of the first user. Since virtual property information is additionally paid as much as the bonus icon information is additionally accumulated, the first user may be further compensated.

Figure 14:
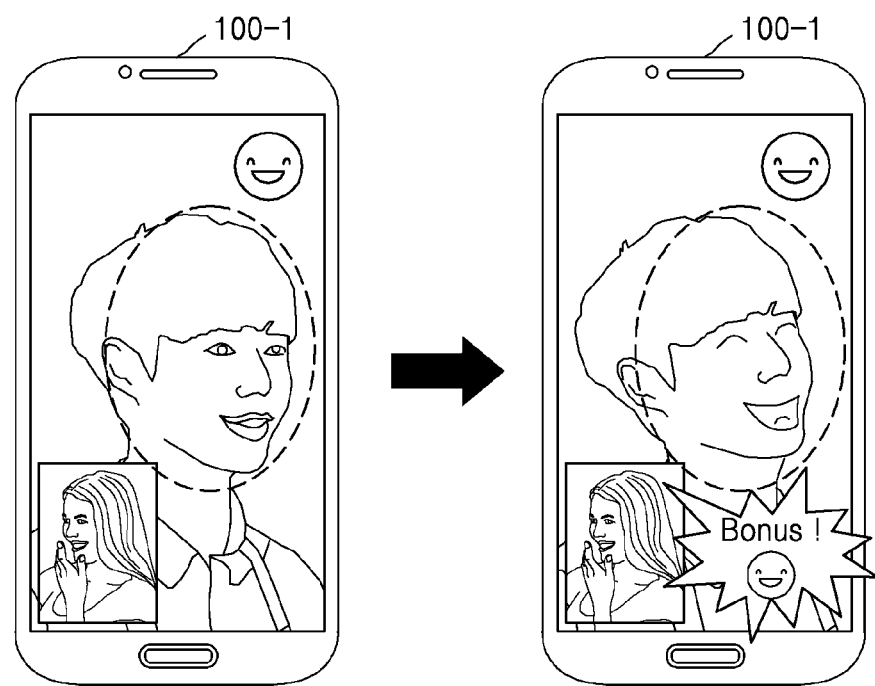
FIG. 14 illustrates a process of generating bonus icon information according to the intensity of a facial expression when the first terminal continuously detects the facial expression of the second user, according to an embodiment.

FIG. 14 illustrates a process of generating bonus icon information according to the intensity of a facial expression when the first terminal 100-1 continuously detects the facial expression of the second user, according to an embodiment.

Referring to FIG. 14, the first terminal 100-1 may continuously detect the facial expression of the second user from the second stream. As illustrated in FIG. 14, the first terminal 100-1 may continuously detect the "laughing facial expression" of the second user from the second stream and then detect the "loudly laughing facial expression" of the second user. The first terminal 100-1 may generate more pieces of icon information when a "loudly laughing facial expression" having a relatively high intensity of the facial expression is detected, than when a "laughing facial expression" having a relatively low intensity of the facial expression is detected.

For example, the first terminal 100-1 may recognize the intensity of a facial expression by comparing a threshold value with a value corresponding to a distance difference between feature points corresponding to each other in no facial expression of the second user and a detected facial expression such as the "laughing facial expression" or the "loudly laughing facial expression" of the second user. In this state, at least one threshold value may exist. The first terminal 100-1 may update the icon information corresponding to the detected facial expression of the second user based on the recognized intensity of the facial expression.

For example, the first terminal 100-1 may display icon information corresponding to the "laughing facial expression" of the second user, for example, a laughing face icon, on the first terminal 100-1. Then, the first terminal 100-1 may display icon information corresponding to the "loudly laughing facial expression" of the second user, for example, a laughing face icon, on the first terminal 100-1. In this state, the first terminal 100-1 may update the laughing face icon base on the intensity of the "loudly laughing facial expression", and additionally display the updated laughing face icon as bonus icon information. When the second user makes a laughing facial expression, the first terminal 100-1 may display icon information about the laughing face icon on the first terminal 100-1. When the second user makes a loudly laughing facial expression, the first terminal 100-1 may display not only the icon information about the laughing face icon, but also bonus icon information, on the first terminal 100-1.

The first terminal 100-1 may transmit the updated icon information of the first user to the server 200 based on the icon information and the bonus icon information that the first user acquired. The updated icon information of the first user may include the type of icons and/or a total of the number of icons and the number of bonus icons for each icon type. The first terminal 100-1 may receive the virtual property information usable for a video call from the server 200, as a response to the transmission of the updated icon information of the first user. Since virtual property information is additionally paid as much as the bonus icon information is additionally accumulated, the first user may be further compensated.

Figure 15:
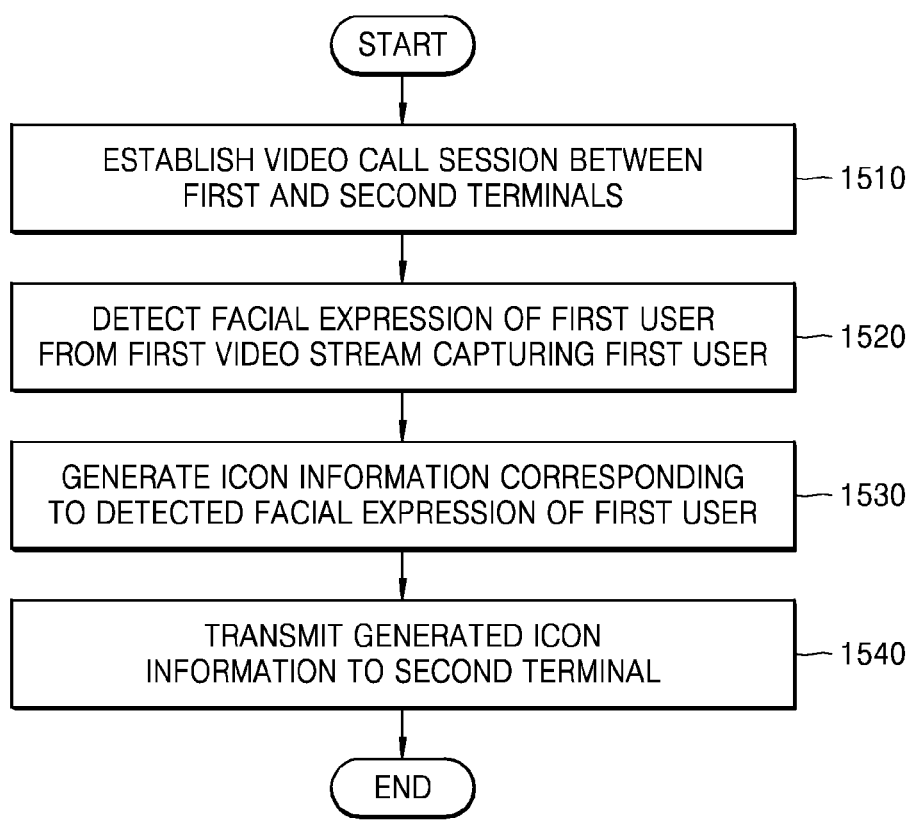
FIG. 15 is a flowchart of a method of providing a video call service by generating icon information corresponding to the first user's facial expression in the first terminal, according to an embodiment.

FIG. 15 is a flowchart of a method of providing a video call service by generating icon information corresponding to the first user's facial expression in the first terminal 100-1, according to an embodiment.

In operation 1510, the first terminal 100-1 may establish a video call session between the first terminal 100-1 of the first user and the second terminal 100-2 of the second user who is the counterpart in the video call.

In operation 1520, the first terminal 100-1 may detect a facial expression of the first user from the first video stream that captures the first user.

The first terminal 100-1 may detect a facial expression of the first user from the first video stream captured by the first terminal 100-1, based on the features on the face of the first user. The first terminal 100-1 may detect the facial expression of the first user in real time or at a predetermined time interval.

In operation 1530, the first terminal 100-1 may generate icon information corresponding to the detected facial expression of the first user.

In operation 1540, the first terminal 100-1 may transmit the generated icon information to the second terminal 100-2.

Furthermore, the first terminal 100-1 may generate icon information in various ways. For example, the first terminal 100-1 may generate bonus icon information when the icon information received from the second terminal 100-2 and the icon information transmitted to the second terminal 100-2 are the same. In another example, the first terminal 100-1 may generate the icon information corresponding to the detected facial expression of the first user when the facial expression of the first user detected from the first video stream and the facial expression of the second user detected from the second stream are the same. In another example, the first terminal 100-1 may generate bonus icon information when the facial expression of the first user detected from the first video stream and the predetermined voice detected from the first user's voice that is input are matched with each other. In another example, the first terminal 100-1 may recognize the intensity of a facial expression by comparing a threshold value with a value corresponding to a distance difference between feature points corresponding to each other in no facial expression of the first user and a detected facial expression of the first user, and generate bonus icon information based on the recognized intensity of the facial expression. In another example, the first terminal 100-1 may generate bonus icon information when the icon information corresponding to the facial expression of the first user detected from the first video stream and the displayed mission icon information are the same.

The first terminal 100-1 may receive virtual property information from the server 200 for providing a video call service, by using the icon information of the first user. For example, the first terminal 100-1 may transmit the icon information of the first user including the icon information received from the second terminal 100-2. The first terminal 100-1 may receive the virtual property information usable for a video call service from the server 200, as a response to the transmission of the icon information of the first user. In another example, the first terminal 100-1 may transmit the icon information of the first user including the icon information transmitted to the second terminal 100-2, to the server 200 for providing a video call service. The first terminal 100-1 may receive the virtual property information usable for a video call service from the server 200, as a response to the transmission of the icon information of the first user.

Figure 16:
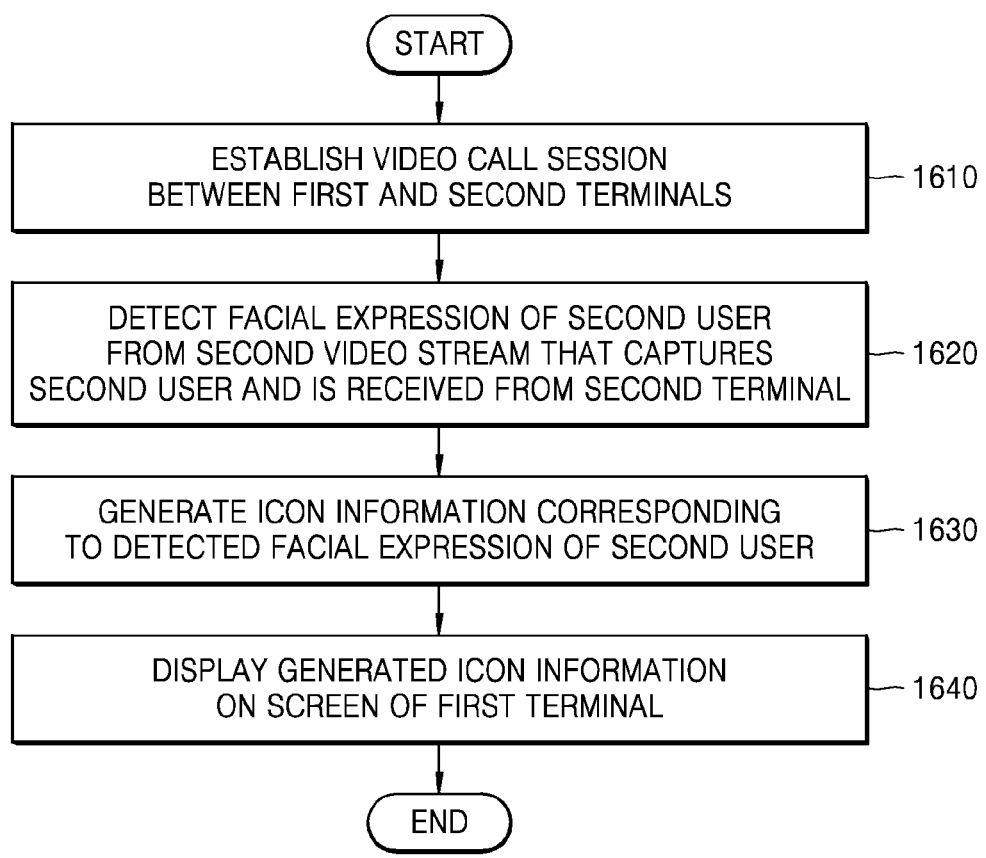
FIG. 16 is a flowchart of a method of providing a video call service by generating icon information corresponding to the facial expression of the second user in the first terminal, according to another embodiment.

FIG. 16 is a flowchart of a method of providing a video call service by generating icon information corresponding to the facial expression of the second user in the first terminal 100-1, according to another embodiment.

In operation 1610, the first terminal 100-1 may establish a video call session between the first terminal 100-1 of the first user and the second terminal 100-2 of the second user who is a counterpart in the video call.

In operation 1620, the first terminal 100-1 may detect the facial expression of the second user from the second stream that captures the second user and is received from the second terminal 100-2.

In operation 1630, the first terminal 100-1 may generate the icon information corresponding to the detected facial expression of the second user.

In operation 1640, the first terminal 100-1 may display the generated icon information on the screen of the first terminal 100-1.

Furthermore, the first terminal 100-1 may generate icon information in various ways. For example, the first terminal 100-1 may generate bonus icon information when the icon information received from the second terminal 100-2 and the icon information transmitted to the second terminal 100-2 are the same. In another example, the first terminal 100-1 may generate the icon information corresponding to the detected facial expression of the second user when the facial expression of the first user detected from the first video stream and the facial expression of the second user detected from the second stream are the same. In another example, the first terminal 100-1 may generate bonus icon information when the facial expression of the second user detected from the second video stream and the predetermined voice detected from the first user's voice that is input are matched with each other. In another example, the first terminal 100-1 may recognize the intensity of a facial expression by comparing a threshold value with a value corresponding to a distance difference between feature points corresponding to each other in no facial expression of the second user and a detected facial expression of the second user, and generate bonus icon information based on the recognized intensity of the facial expression.

The first terminal 100-1 may receive virtual property information from the server 200 for providing a video call service by using the icon information of the first user. For example, the first terminal 100-1 may transmit the icon information of the first user including the icon information displayed on the first terminal 100-1, to the server 200 for providing a video call service. The first terminal 100-1 may receive the virtual property information usable for a video call service, from the server 200, as a response to the transmission of the icon information of the first user.

The above-described embodiments related to the method of providing a video call service may be provided in the form of an application stored in a computer-readable storage medium to perform a method of providing a video call service, in the terminal 100 for providing a video call service. In other words, the embodiment related to the method of providing a video call service may be provided in the form of an application or a computer program stored in a computer-readable storage medium so that the terminal 100 may perform the above-described operations of the method of providing a video call service.

The above-described embodiments may be implemented in the form of a computer-readable storage medium for storing instructions of data executable by a computer or a processor. At least one of the instruction and data may be stored in the form of a program code, and when performed by a processor, may perform a certain operation by generating a certain program module. Such a computer-readable storage medium may include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage apparatuses, optical data storage apparatuses, hard disks, solid-state disks (SSDs), and any apparatus capable of storing instructions or software, related data, data files, and data structures, and providing the instructions or software, related data, data files, and data structures to a processor or a computer so that the processor or the computer may execute the instructions.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. An application stored in a computer-readable storage medium to perform a method of providing a video call service, the method comprising:
   in a first terminal,
   establishing a video call session between the first terminal of a first user and a second terminal of a second user;
   detecting a facial expression of the first user from a first video stream that captures the first user;
   generating icon information corresponding to the detected facial expression of the first user; and
   transmitting the generated icon information to the second terminal,
   wherein the detecting of the facial expression of the first user comprises recognizing intensity of the facial expression by comparing a threshold value with a value corresponding to a distance difference between feature points corresponding to each other in no facial expression of the first user and the detected facial expression of the first user.

2. The application of claim 1, wherein the method further comprises:
   receiving, from the second terminal, icon information corresponding to a facial expression of the second user detected from a second video stream that captures the second user; and
   receiving, from a server, virtual property information usable for the video call service, as a response to the transmission of the icon information of the first user including the received icon information to the server for providing the video call service.

3. The application of claim 1, wherein the method further comprises receiving, from a server, virtual property information usable for the video call service, as a response to the transmission of the icon information of the first user including the transmitted icon information to the server for providing the video call service.

4. The application of claim 1, wherein the method further comprises:
   receiving, from the second terminal, icon information corresponding to a facial expression of the second user detected from a second video stream that captures the second user; and
   when the received icon information and the transmitted icon information are the same, updating the icon information of the first user.

5. The application of claim 1, wherein the method further comprises detecting a facial expression of the second user from a second video stream that captures the second user and is received from the second terminal, and
    wherein, in the generating of the icon information, when the detected facial expression of the first user and the detected facial expression of the second user are the same, icon information corresponding to the detected facial expression of the first user is generated.

6. The application of claim 1, wherein the method further comprises:
    detecting predetermined voice from voice of the first user; and
    when the detected facial expression of the first user and the detected predetermined voice are matched with each other, updating the icon information of the first user.

7. The application of claim 1,
    wherein the generating of the icon information comprises updating icon information corresponding to the detected facial expression of the first user based on the recognized intensity of the facial expression.

8. The application of claim 1, wherein the method further comprises:
    displaying mission icon information on a screen of the first terminal; and
    when the generated icon information and displayed mission icon information are the same, updating the icon information of the first user.

9. An application stored in a computer-readable storage medium to perform a method of providing a video call service, the method comprising:
    in a first terminal,
    establishing a video call session between the first terminal of a first user and a second terminal of a second user who is a counterpart in a video call;
    detecting a facial expression of the second user from a second video stream that captures the second user and is received from the second terminal;
    generating icon information corresponding to the detected facial expression of the second user; and
    displaying the generated icon information on a screen of the first terminal,
    wherein the detecting of the facial expression of the second user comprises recognizing intensity of the facial expression by comparing a threshold value with a value corresponding to a distance difference between feature points corresponding to each other in no facial expression of the second user and the detected facial expression of the second user.

10. The application of claim 9, wherein the method further comprises receiving, from a server, virtual property information usable for the video call service, as a response to the transmission of the icon information of the first user including the displayed icon information to the server for providing the video call service.

11. The application of claim 9, wherein the method further comprises detecting a facial expression of the first user from a first video stream that captures the first user, and
    wherein, in the generating of the icon information, when the detected facial expression of the second user and the detected facial expression of the first user are the same, icon information corresponding to the detected facial expression of the second user is generated.

12. The application of claim 9, wherein the method further comprises:
    detecting predetermined voice from voice of the first user; and
    when the detected facial expression of the second user and the detected predetermined voice are matched with each other, updating the icon information of the first user.

13. The application of claim 9,
    wherein the generating of the icon information comprises updating icon information corresponding to the detected facial expression of the second user based on the recognized intensity of the facial expression.

14. A non-transitory computer-readable storage medium storing instructions that are executable by a processor, the instructions comprising:
    instructions to establish a video call session between the first terminal of a first user and a second terminal of a second user;
    instructions to detect a facial expression of the first user from a first video stream that captures the first user;
    instructions to generate icon information corresponding to the detected facial expression of the first user; and
    instructions to transmit the generated icon information to the second terminal,
    wherein the instructions to detect the facial expression of the first user comprises recognizing intensity of the facial expression by comparing a threshold value with a value corresponding to a distance difference between feature points corresponding to each other in no facial expression of the first user and the detected facial expression of the first user.

* * * * *